Sept. 2, 1941.  L. R. CARLEY  2,254,418

REINFORCED PLASTIC BUTTON

Filed Nov. 12, 1940

Inventor:
Leonard R. Carley,
By Parker Cook
Attorney.

Patented Sept. 2, 1941

2,254,418

UNITED STATES PATENT OFFICE 2,254,418

REINFORCED PLASTIC BUTTON

Leonard R. Carley, Watertown, Conn., assignor to The Patent Button Company, Waterbury, Conn., a corporation of Connecticut Application November 12, 1940, Serial No. 365,372

3 Claims. (Cl. 24—95)

My invention relates to new and useful improvements in reinforced plastic buttons, and has for an object to provide a button that will be relatively light in weight and inexpensive to manufacture.

A further object of the present invention is to provide a metal button back or shell which is to be filled with a plastic material, such as Bakelite, and after being filled, the peripheral edge of the shell is to be rimmed or rolled about the plastic filler to thereby provide a plastic button that is well reinforced by the metal shell, which shell will not only protect the body of the button but will well protect the hub of the button against fracture during the button-attaching operation.

A further object of the invention is to provide a metal button back or shell, in which may be inserted a pre-molded plastic slug or filler, which is to be held firmly in position by the subsequent rimming of the button back shell.

Still another object of the invention is to provide a reinforced plastic button wherein insignia or a design is to be molded on the face of the plastic insert, and if the letters are sunken or intaglio, the same may be sprayed with lacquer of a contrasting color, so that the said letters or depressions will show up well on the face of the button.

Still another object of the invention is to provide a reinforced plastic button wherein the plastic insert will have molded on its face the desired insignia or design. If the plastic is to be molded within the shell, the mold will have the desired insignia cut therein or the button may be subjected to a later mold to form the insignia on the face of the button. Furthermore, if the plastic insert is to be first pre-molded and placed in the shell, the pre-molded plastic likewise, during its molding operation, will have the insignia or design impressed in its face.

Still another object of the invention is to provide a plastic button wherein a vise or anchor may be molded in the plastic, which vise will turn or deform the prong of a tack or the prongs of a staple to thus hold the button to its cloth.

Still another object of the invention is to provide a relatively light and inexpensive button employing a metal back or shell which is perforate at its bottom, which shell is to be filled with a plastic and the plastic, in turn, provided with a bore to hold and grip the prong of a fastening element when driven into said bore.

Still another object of the invention is to provide a metal button back or shell which is to be filled with a plastic material, such as Bakelite, and wherein, rather than rolling or rimming the shell after the plastic has been molded, the edge of the shell is to be pre-rolled or pre-rimmed and thus save later rimming or rolling.

With these and other objects in view, the invention consists in certain new and novel arrangements and combination of parts, as will be hereinafter more fully described and pointed out in the claims.

Referring now to the drawing showing a preferred embodiment and several modifications, Fig. 1 is an enlarged top plan view of a button of the preferred form;

Figure 1:
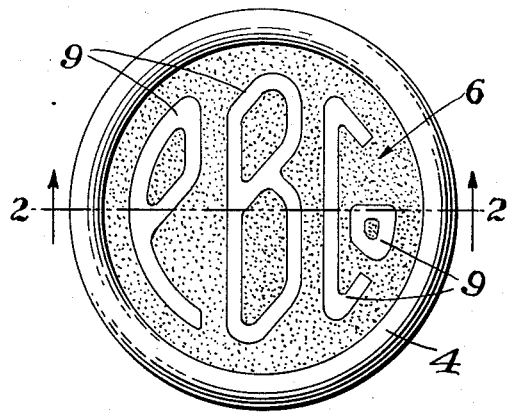
Figure 4:
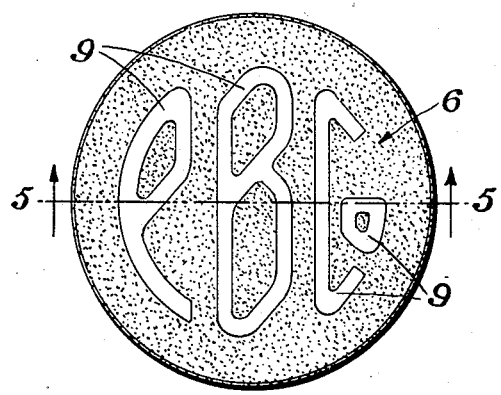
Fig. 4 is a top plan view of a plastic slug or filler.
Figure 2:
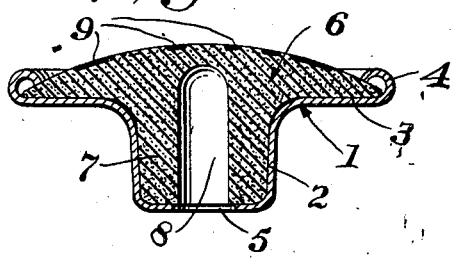
Fig. 2 is a vertical sectional view taken on the line 2—2 of Fig. 1.
Figure 3:
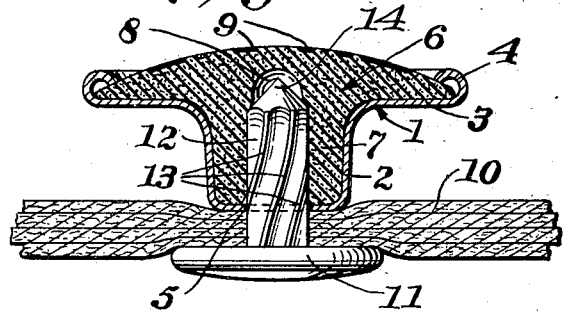
Fig. 3 is a similar view showing the button as attached to a garment.

Referring now to the drawing and for the moment to Figs. 2 and 3, there will be seen a metal back 1 with its hub 2, its body portion 3, and the rim 4. The hub of the shell on its bottom is perforated, as at 5, to receive a fastening element, while fitted within the shell may be seen the plastic filler 6, which may be of Bakelite or any other similar plastic material.

Figure 5:
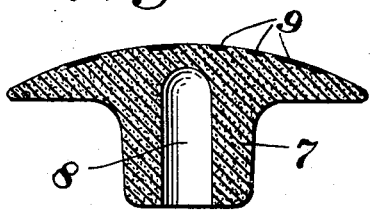
Fig. 5 is a vertical sectional view taken on the line 5—5 of Fig. 4.

In Fig. 5, this pre-molded slug or filler is shown before being placed in the shell, and it will be noticed that it likewise has a hub 7, in which there is formed the central bore 8, while in the face may be pressed the desired insignia 9. This insignia will be sprayed, so that the same will be filled with pigmented enamel, after which the surface will be wiped off, or other methods may be used for filling the letters, so that they will form a pleasing contrast with the Bakelite surface.

This pre-molded slug or filler, as shown in Fig.

5, is then placed within the shell, after which the flange 4 of the shell is either rimmed or curled, as may be seen in Fig. 2. This makes a well reinforced and inexpensive plastic button, which is also relatively light in weight.

In Fig. 3, I have shown the button as attached to a garment 10. There will be noticed a fastener 11 with its prong 12, which is preferably fluted, as at 13. The prong is pointed, as at 14, to readily pierce the cloth and wedge itself up into the bore 8. The diameter of the prong is several thousandths greater than the diameter of the bore 8, but it is to be remembered that these buttons are fastened in a button-attaching machine and relatively great pressure is exerted on the button head to force it down on the prong of the tack and thus drive the prong tightly within the bore.

Figure 6:
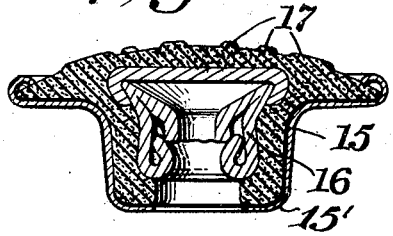
Fig. 6 is a similar vertical sectional view showing a vise embedded in the Bakelite slug and showing raised insignia.

Referring to a slight modification, there is shown in Fig. 6 a button consisting of the plastic slug or filler 15 fitted within its shell 15', and there is also shown molded in the plastic filler a vise 16, which vise is of a conventional type, so that when the prong of a conventional tack fastener (not shown) is driven in the vise, the prong will be deflected and deformed and thus tightly hold the button to its cloth in a well-known manner.

It will be understood that in this form, the slug or filler is pre-molded and placed within its shell, as also shown in Figs. 2 and 3, and the outer peripheral flange of the shell rimmed or rolled to hold the Bakelite filler tightly within its shell. In this instance, I have shown raised insignia 17, but it will be understood that it might be either raised or sunken in the same manner that it might be in the preferred form.

Figures 7, 9:
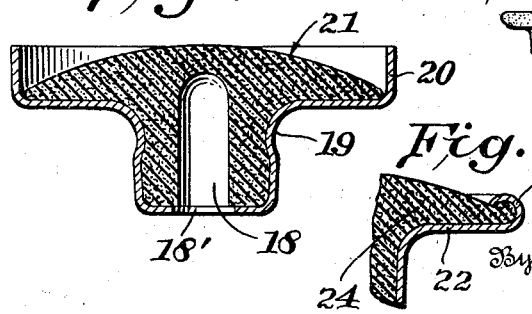
Fig. 7 is a similar sectional view illustrating a modified form in which the Bakelite is molded into the metal shell back rather than being pre-molded.
Fig. 9 is a fragmentary detail of a still further slight modification where the peripheral edge of the shell is shown as pre-rolled or pre-rimmed.

In Fig. 7, there is shown a further modification, and in this instance, rather than pre-molding the Bakelite filler, it is to be deposited and molded right in the shell and be provided with the central bore 18. Also, the hub of the shell may be slightly ringed or depressed circumferentially, as at 19, for holding the filler in place and will be provided with a central perforation 18'. After the molding operation, the flange 20 may be pressed down or rolled, similar to that shown in Figs. 2 and 3.

Also in Fig. 9 there is shown a further slight modification wherein the shell 22 has the edge or flange 23 pre-rimmed or pre-rolled, so that when the plastic material 24 is molded within the shell, it fills up the rolled or rimmed edge and thus does away with the necessity of rimming or rolling the shell after the Bakelite has hardened within the shell. This would entirely eliminate any tendency whatever of the Bakelite from being fractured during a rimming operation.

If the plastic filler is not pre-molded, insignia may be impressed in the surface 21 with a single die, after the button is molded, by using a hot die and a few seconds dwell in contact with the face of the Bakelite button. Letters sunken in this manner can be of only very limited depth but deep enough, however, for practical purposes, and after the letters are once formed, they may be pigmented in the same manner as shown in the preferred form.

It will be understood that although I have shown in Fig. 7 the plastic hub as being provided with a straight bore to receive a fastener, similar to the fastener 11 shown in Fig. 3, this plastic filler might have molded therein a vise similar to the vise 16 shown in Fig. 6, and in that instance, the prong of the fastener would be of the conventional type and deformed within the vise, as will be readily understood.

Figure 8:
Fig. 8 is a view showing various shaped tops for the buttons, such as flat, dome, convex, and concave.

Although I have shown the button as being of convex shape in Figs. 1 to 7, inclusive, it will be understood that the surface of the button might be flat, as shown in Fig. 8, or it may be domed or concave, and in all instances, the letters will be either sunken, raised, or flush with the surface, as desired.

It will also be understood that although I have shown the button as being round in top plan, it might be of any other desired shape.

From the foregoing, it will be seen that I have provided a reinforced plastic button, which consists primarily of a shell and Bakelite filler which filler may either be pre-molded or molded right within the shell. The plastic surface will also be provided with insignia which will preferably be of a contrasting color, so that the surface of the button will have a pleasing appearance. The button may have a vise molded right in the filler or it may have just the straight bore and the special form of fastener to be driven in the bore.

Many slight changes might be made in the construction hereinbefore set forth without in any way departing from the spirit and scope of the invention.

Having thus described my invention, what I claim as new and desire to secure by Letters Patent is:

1. A reinforced plastic button comprising a metal shell having a hub, a body portion, and an outer peripheral flange, a plastic material filling said shell, and the said peripheral flange rimmed tightly about the said plastic filler and the hub of the filler adapted to receive a fastener.

2. A reinforced plastic button comprising a metal back body shell provided with a peripheral flange and open at its top, a hard plastic filler within said shell and completely filling the same, metal means embedded in the plastic for receiving and deforming a fastening element, the flange of the shell being rimmed about the peripheral edge of the plastic filler, the top surface of the filler forming the face of the button and adapted to have insignia stamped therein.

3. A reinforced plastic button including a metal-encasing shell having a peripheral flange and open at its top, a hard pre-molded plastic filler tightly fitted within said shell and completely filling the same, the top surface of the plastic forming the face of the button and adapted to have insignia stamped thereon, the said plastic filler having a bore in its under portion and the said bore terminating short of the top surface of the plastic filler and adapted to receive a fastening element during an attaching operation, and the bottom of the shell provided with an opening registering with said bore to permit the passage of said fastening element into the aforementioned bore.

LEONARD R. CARLEY.